(12) United States Patent
Harada et al.

(10) Patent No.: US 9,048,637 B2
(45) Date of Patent: Jun. 2, 2015

(54) GAS-INSULATED SWITCHGEAR

(75) Inventors: Takashi Harada, Tokyo (JP); Masato Kawahigashi, Tokyo (JP)

(73) Assignee: MITSUBISHI ELECTRIC CORPORATION, Chiyoda-Ku (JP)

( * ) Notice: Subject to any disclaimer, the term of this patent is extended or adjusted under 35 U.S.C. 154(b) by 280 days.

(21) Appl. No.: 13/822,699

(22) PCT Filed: Sep. 24, 2010

(86) PCT No.: PCT/JP2010/066570
§ 371 (c)(1),
(2), (4) Date: Mar. 13, 2013

(87) PCT Pub. No.: WO2012/039059
PCT Pub. Date: Mar. 29, 2012

(65) Prior Publication Data
US 2013/0279084 A1 Oct. 24, 2013

(51) Int. Cl.
*H02B 1/20* (2006.01)
*H02B 13/00* (2006.01)
*H02B 5/06* (2006.01)

(52) U.S. Cl.
CPC . *H02B 13/00* (2013.01); *H02B 5/06* (2013.01)

(58) Field of Classification Search
USPC .................................................. 361/600–657
See application file for complete search history.

(56) References Cited

U.S. PATENT DOCUMENTS 4,503,481 A * 3/1985 Fujiya et al. .................. 361/612
8,089,020 B2 * 1/2012 Kisanuki et al. ................ 218/7
8,228,665 B2 * 7/2012 Fujita et al. ................... 361/612
8,254,088 B2 * 8/2012 Tanaka et al. ................. 361/604
2006/0283841 A1 * 12/2006 Sologuren-Sanchez et al. ............................ 218/79

FOREIGN PATENT DOCUMENTS

| JP | 60-43006 A | 3/1985 |
| JP | 62-104408 A | 5/1987 |
| JP | 2007-524337 A | 8/2007 |

(Continued)

OTHER PUBLICATIONS

International Search Report (PCT/ISA/210) mailed on Oct. 19, 2010, by the Japanese Patent Office as the International Searching Authority for International Application No. PCT/JP2010/066570.

(Continued)

*Primary Examiner* — Courtney Smith
(74) *Attorney, Agent, or Firm* — Buchanan Ingersoll & Rooney PC

(57) ABSTRACT

A gas-insulated switchgear includes: a circuit breaker; a connection bus bar; a first disconnect switch; a second disconnect switch; a line bus bar; a main bus bar; and an abutment. The circuit breaker includes first and second branch outlets provided on a side surface of a cylindrical circuit breaker tank. The connection bus bar has one end connected to the first branch outlet. The first disconnect switch is connected to the other end of the connection bus bar. The second disconnect switch is connected to the second branch outlet. The line bus bar is led out from the second disconnect switch in a horizontal direction. The main bus bar is arranged above the second disconnect switch coaxially with the second branch outlet. The abutment is fixed to a top portion of the second disconnect switch and supports the main bus bar from below.

8 Claims, 8 Drawing Sheets

(56) References Cited

FOREIGN PATENT DOCUMENTS

| | | |
|---|---|---|
| JP | 2007-295669 A | 11/2007 |
| JP | 2008-245376 A | 10/2008 |
| WO | WO 2005/083859 A1 | 9/2005 |

OTHER PUBLICATIONS

Written Opinion (PCT/ISA/237) mailed on Oct. 19, 2010, by the Japanese Patent Office as the International Searching Authority for International Application No. PCT/JP2010/066570.

* cited by examiner

GAS-INSULATED SWITCHGEAR

FIELD

The present invention relates to a gas-insulated switchgear.

BACKGROUND

A gas-insulated switchgear is configured to arrange required devices such as a circuit breaker within a metal container sealed and filled with insulating gas such as $SF_6$ (sulfur hexafluoride) gas. Whether the gas-insulated switchgear is installed indoors or outdoors, strong demand rises for a reduction in the installation area of the gas-insulated switchgear and it is a great challenge to address the problem of the installation of the gas-insulated switchgear while improving storage efficiency in a limited space.

Patent Literature 1 describes a configuration of a gas-insulated switchgear including: a circuit breaker that has two branch outlets facing upward on a side surface thereof and that is arranged with the longitudinal direction set horizontally; a bus-bar-side device that is connected to one of the branch outlets of the circuit breaker; and a line-side device that is connected to the other branch outlet of the circuit breaker, wherein a bus bar included in the bus-bar-side device extends in a direction orthogonal to the longitudinal direction of the circuit breaker above the circuit breaker and between the two branch outlets.

CITATION LIST

Patent Literature

Patent Literature 1: Japanese Patent Application Laid-open No. 2008-245376

SUMMARY

Technical Problem

However, the gas-insulated switchgear described in Patent Literature 1 has the following problems. Because of the arrangement of the bus bar between the two branch outlets, the circuit breaker becomes longer in the longitudinal direction by the width of a bus bar tank. As a result, there is also a problem that the installation area of the gas-insulated switchgear disadvantageously becomes larger.

The present invention has been made to solve the above problems, and an object of the present invention is to provide a gas-insulated switchgear capable of realizing a reduction of an installation area.

Solution to Problem

To solve the above described problems and achieve the object a gas-insulated switchgear according to an aspect of the present invention includes: a circuit breaker that includes first and second branch outlets provided on a side surface of a cylindrical circuit breaker tank, the branch outlets being arranged to be distant from each other in a longitudinal direction of the circuit breaker tank and both branching off to upward; a connection bus bar that has one end connected to the first branch outlet and that extends upward; a first disconnect switch that is connected to the other end of the connection bus bar and that is arranged coaxially with the first branch outlet; a second disconnect switch that is connected to the second branch outlet, that is arranged coaxially with the second branch outlet, and that is arranged at a lower position than a position of the first disconnect switch; a line bus bar that is led out from the second disconnect switch in a horizontal direction; a main bus bar that is arranged above the second disconnect switch coaxially with the second branch outlet, that is connected to the first disconnect switch, and that extends in the horizontal direction orthogonal to the longitudinal direction of the circuit breaker tank; and an abutment that is fixed to a top portion of the second disconnect switch and that supports the main bus bar from below.

Advantageous Effects of Invention

According to the present invention, the installation area can be reduced.

According to the present invention, the abutment has a simple structure and is easy to attach.

DESCRIPTION OF EMBODIMENTS

Exemplary embodiments of a gas-insulated switchgear according to the present invention will be explained below in detail with reference to the accompanying drawings. The present invention is not limited to the embodiments.

First Embodiment

Figure 1:
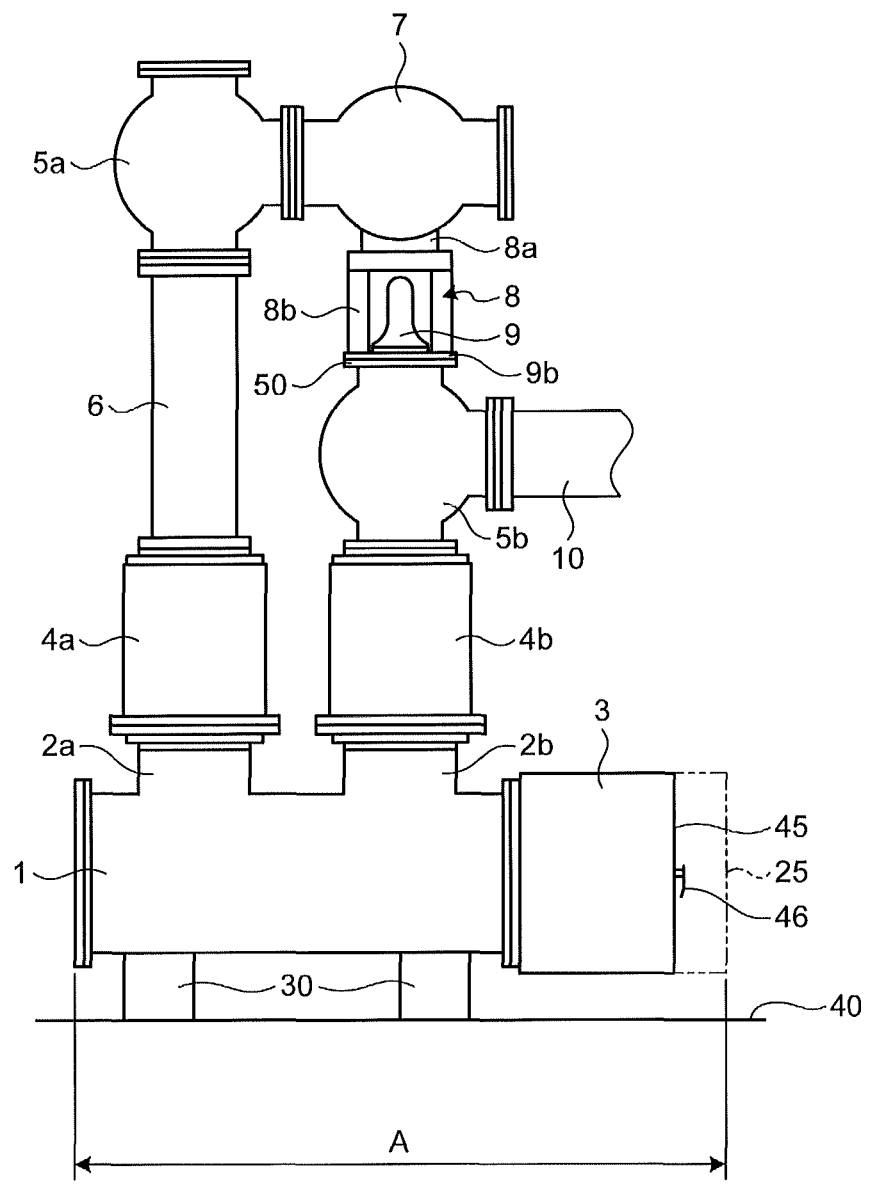
FIG. 1 depicts a configuration of a gas-insulated switchgear according to a first embodiment of the present invention.

FIG. 1 depicts a configuration of a gas-insulated switchgear according to a first embodiment of the present invention. As shown in FIG. 1, a circuit breaker 1 is what is called a horizontal circuit breaker, arranged with a longitudinal direction thereof set horizontally, and supported by an abutment 30 provided on an installation surface 40. A pair of branch outlets 2*a* and 2*b* arranged at a predetermined interval in the longitudinal direction and both facing upward are provided on a side surface of a circuit breaker tank of the circuit breaker 1. For example, the branch outlets 2*a* and 2*b* are provided at an equal distance from a longitudinal center of the circuit breaker tank. The circuit breaker tank, which is a cylindrical metal container, is grounded and has a circuit break unit (not shown) accommodated therein. The gas-insulated switchgear according to the first embodiment is applicable to both a three-phase collective type and a phase separation type.

An operation device 3 for the circuit breaker 1 is provided side by side with the circuit breaker 1 on one longitudinal end, or specifically, on an end thereof near the branch outlet 2b. The operation device 3 is configured to store an operation unit (not shown) within a box constituting an outer frame, and a door 45 is provided on this box on a side in the longitudinal direction of the circuit breaker 1 and is opened or closed by operating an opening/closing lever 46, for example. In an example shown in FIG. 1, the door 45 of the operation device 3 is in a closed state. In a state where the door 45 is open, a longitudinal length of the circuit breaker 1 including the operation device 3 is larger than that shown in the example of FIG. 1. That is, in a state where the door 45 is fully open, the longitudinal length of the circuit breaker 1 including the operation device 3 is A. A door-open-state end 25 indicates a position of an end of the door 45 in the state where the door 45 is fully open.

An instrument current transformer 4a is connected to the branch outlet 2a. The instrument current transformer 4a is arranged on a top portion of the circuit breaker 1. The instrument current transformer 4a measures a current carried across a central conductor (not shown) that is an energized unit connected to the circuit break unit of the circuit breaker 1.

A cylindrical connection bus bar 6 extending upward is connected to the instrument current transformer 4a. In addition, a disconnect switch 5a is connected to the connection bus bar 6. That is, one end of the connection bus bar 6 is connected to the instrument current transformer 4a and the other end thereof is connected to the disconnect switch 5a. The instrument current transformer 4a, the connection bus bar 6, and the disconnect switch 5a are arranged coaxially with the branch outlet 2a and above the circuit breaker 1. For example, a disconnect switch with an earth switch may be used as the disconnect switch 5a. Alternatively, the earth switch may be provided separately from the disconnect switch 5a. A main bus bar 7 is connected to the disconnect switch 5a.

An instrument current transformer 4b is connected to the branch outlet 2b. The instrument current transformer 4b is arranged on a top portion of the circuit breaker 1. The instrument current transformer 4b measures a current that flows in a central conductor (not shown) that is an energized unit connected to the circuit break unit of the circuit breaker 1. While the instrument current transformers 4a and 4b are attached to the branch outlets 2a and 2b, respectively, in FIG. 1, the instrument current transformers 4a and 4b may be attached to only one of the branch outlets 2a and 2b, for example.

A disconnect switch 5b is connected to the instrument current transformer 4b. An arrangement height of the disconnect switch 5b is lower than that of the disconnect switch 5a by a length of the connection bus bar 6. A disconnect switch with an earth switch may be used as the disconnect switch 5b, for example. Alternatively, the earth switch may be provided separately from the disconnect switch 5b.

A line bus bar 10 is connected to the disconnect switch 5b, and is led out, for example, in the same direction as the longitudinal direction of the circuit breaker 1 and to a side on which the operation device 3 is arranged. For example, a cable head or an air bushing (not shown) is connected to the line bus bar 10.

An abutment 8 is fixed to a top portion of the disconnect switch 5b. This abutment 8 supports the main bus bar 7 arranged above the disconnect switch 5b from below. The main bus bar 7 is arranged coaxially with the branch outlet 2b. Furthermore, the main bus bar 7 is arranged at the same height as that of the disconnect switch 5a, for example. This configuration is preferable because a distance between the main bus bar 7 and the disconnect switch 5a is the shortest. Nevertheless, the main bus bar 7 may be arranged at a different height from that of the disconnect switch 5a. For example, the main bus bar 7 extends in a direction orthogonal to the longitudinal direction of the circuit breaker 1.

The abutment 8 is configured to include a support 8a that directly supports the main bus bar 7 and a leg 8b connected to this support 8a. The main bus bar 7 is supported by the support 8a of the abutment 8 to be movable in the extending direction of the main bus bar 7. Therefore, for example, the support 8a is U-shaped or V-shaped in a cross-section. Therefore, even if the main bus bar 7 moves in the extending direction because of vibration, contraction, or the like, a resultant stress is not applied to the abutment 8 as a heavy load.

A fast earth switch (Fast Earth Switching) 9 is provided on a top portion of the disconnect switch 5b. The fast earth switch 9 forcibly extinguishes, for example, an arc current and enables fast reclosing. A flange 9b that is a part of the fast earth switch 9 and that is provided in a lower portion of the fast earth switch 9 is fixedly fastened to a top plate 50 of the disconnect switch 5b with a fastening member such as a bolt. At that time, the leg 8b of the abutment 8 is also fastened to the top plate 50 together with the flange 9b. This makes it possible to efficiently assemble the fast earth switch 9 and the abutment 8 on the disconnect switch 5b. Furthermore, the abutment 8 is easy to attach because the top plate 50 of the disconnect switch 5b is plane.

Figure 5:
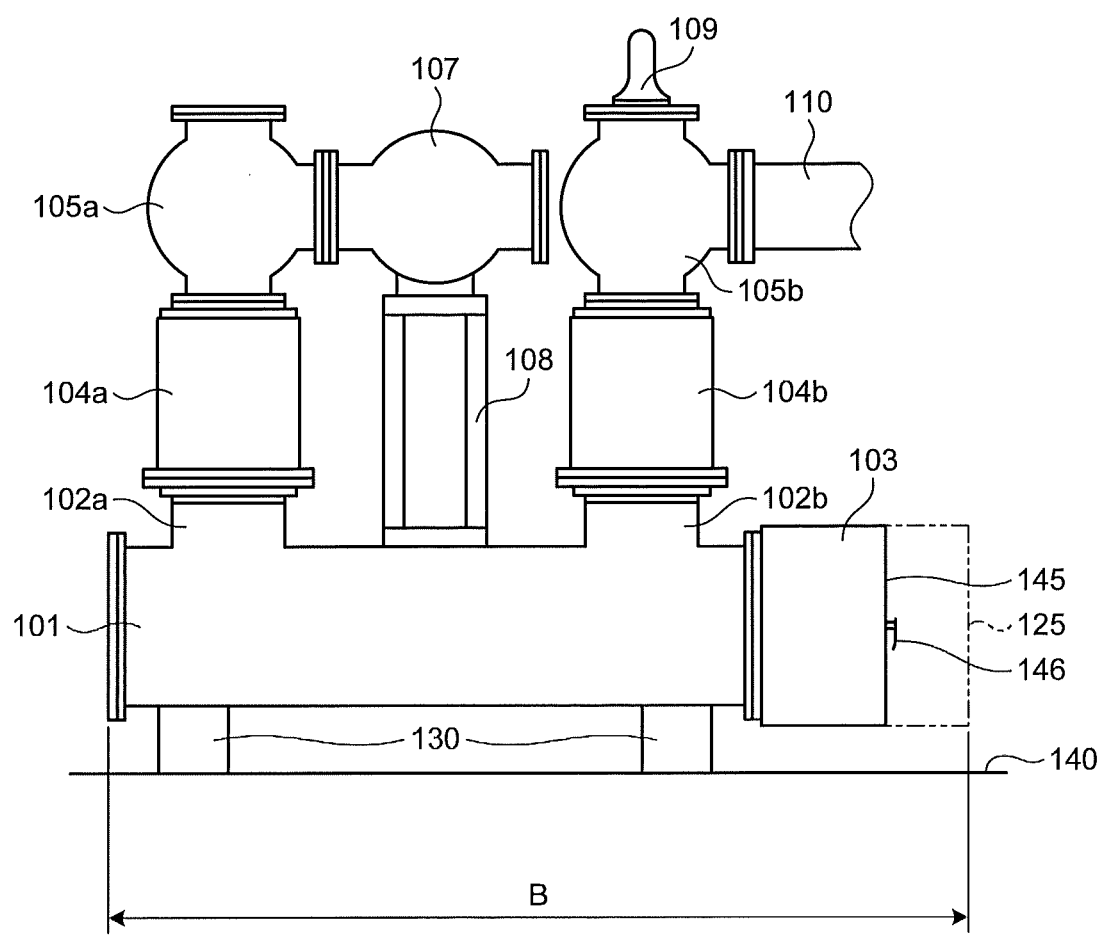
FIG. 5 depicts a configuration of a conventional gas-insulated switchgear.

For comparison with the configuration according to the first embodiment, a configuration of a conventional gas-insulated switchgear including a horizontal circuit breaker is explained next. FIG. 5 depicts a configuration of the conventional gas-insulated switchgear.

As shown in FIG. 5, the conventional gas-insulated switchgear is configured to include: a horizontal circuit breaker 101; an abutment 130 installed on an installation surface 140 and supporting the circuit breaker 101; a pair of branch outlets 102a and 102b provided on a side surface of a circuit breaker tank of the circuit breaker 101 and both branching off to upward; an instrument current transformer 104a provided on a top portion of the branch outlet 102a; a disconnect switch 105a provided on a top portion of the instrument current transformer 104a; a main bus bar 107 connected to the disconnect switch 105a and arranged above the circuit breaker 101 and between the branch outlets 102a and 102b, an abutment 108 provided on a top portion of the circuit breaker 101, fixed between the branch outlets 102a and 102b, and supporting the main bus bar 107 from below; an instrument current transformer 104b provided on a top portion of the branch outlet 102b; a disconnect switch 105b provided on a top portion of the instrument current transformer 104; a line bus bar 110 connected to the disconnect switch 105b; a fast earth switch 109 provided on a top portion of the disconnect switch 105b; and an operation device 103 for the circuit breaker 101 provided side by side with the circuit breaker 101.

In FIG. 5, the main bus bar 107 extends in a direction orthogonal to a longitudinal direction of the circuit breaker 101 between the branch outlets 102a and 102b. Therefore, a distance between the branch outlets 102a and 102b needs to be larger than at least a tank diameter of the main bus bar 107, which inevitably increases a longitudinal length of the circuit breaker 101. In contrast, according to the first embodiment, a distance between the branch outlets 2a and 2b can be made shorter than that shown in FIG. 5 by a main bus bar tank width and the longitudinal length of the circuit breaker 1 is smaller than that shown in FIG. 5 because the main bus bar 7 is arranged coaxially with the branch outlet 2b above the branch outlet 2b (FIG. 1). Therefore, the longitudinal length A of the circuit breaker 1 including the operation device 3 can be made shorter than a longitudinal length B of the circuit breaker 101 including the operation device 103. FIG. 5 depicts a door 145 of the operation device 103, an opening/closing lever 146 provided on the door 145, and a door-open-state end 125. The door-open-state end 125 represents a farthest end of the door 145 from a center of the circuit breaker 101 in the state where the door 145 is fully open.

Furthermore, in FIG. 5, the abutment 108 needs to be fixed onto the circuit breaker 101 to support the main bus bar 107. However, because of a cylindrical shape of the circuit breaker 101, it is not easy to fix a lower portion of the abutment 108 onto the circuit breaker 101, a separate structure for attachment is required, and it takes time and labor for the attachment. In contrast, according to the first embodiment, it suffices to fix the abutment 8 onto the plane top plate 50 of the disconnect switch 5b, for example. This can simplify the structure of the abutment 8 and facilitate attachment of the abutment 8. Moreover, the abutment 8 can be efficiently attached to the disconnect switch 5b by fastening the abutment 8 together with the fast earth switch 9.

As described above, according to the first embodiment, the longitudinal length of the circuit breaker 1 can be made shorter than that of the conventional technique and an installation area of the gas-insulated switchgear can be reduced because the main bus bar 7 can be arranged above the branch outlet 2b.

Furthermore, according to the first embodiment, it is possible to simplify the structure of the abutment 8 and facilitate attachment thereof as compared with the conventional technique because it suffices to arrange the abutment 8 supporting the main bus bar 7 on the top portion of the disconnect switch 5b.

Figure 2:
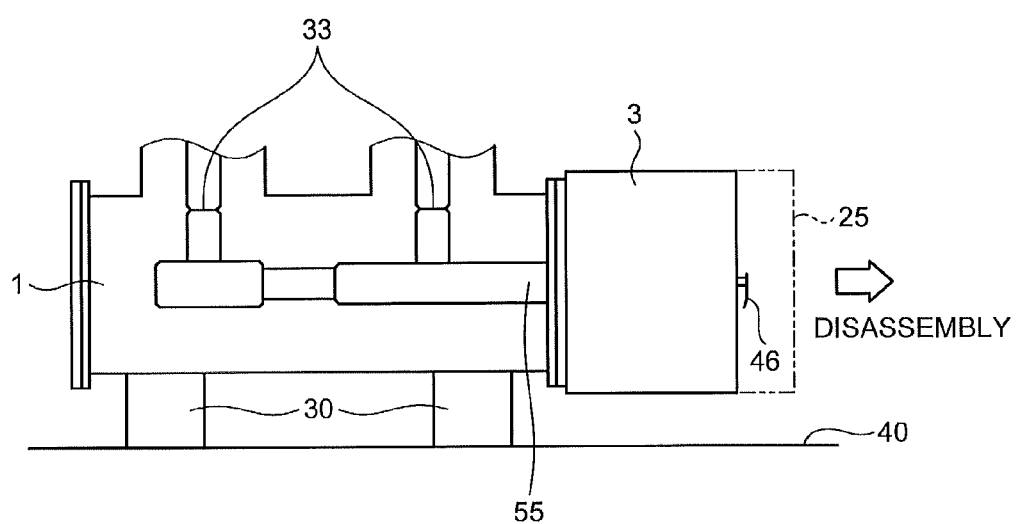
FIG. 2 depicts a part of a procedure of disassembling the gas-insulated switchgear according to the first embodiment.
Figure 8:
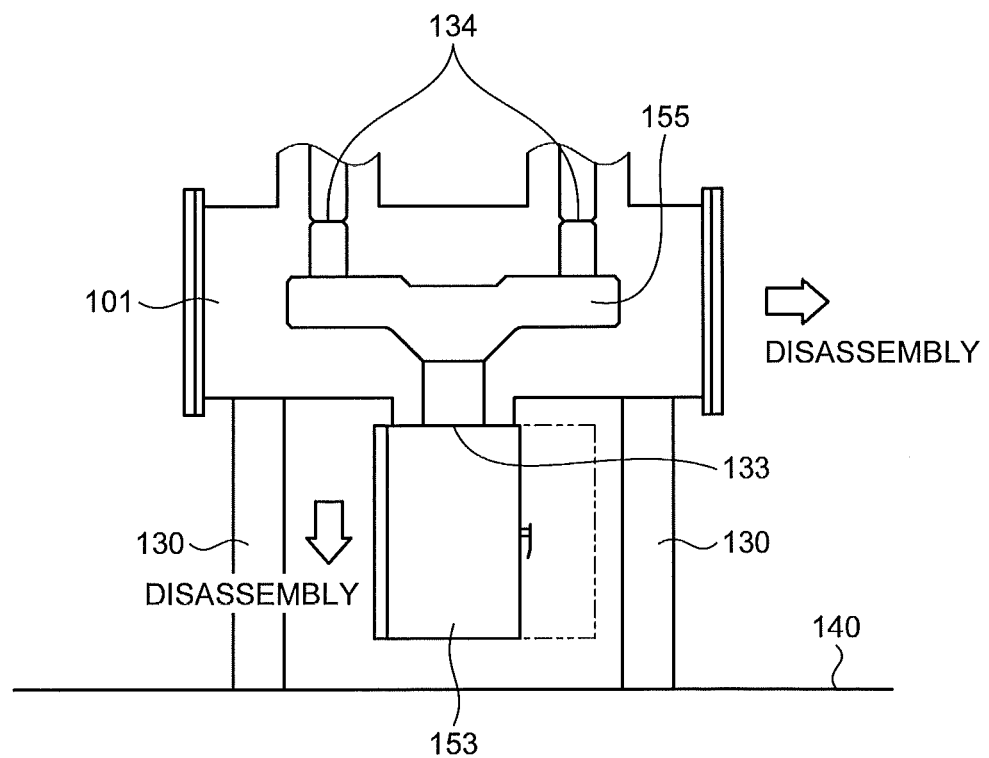
FIG. 8 depicts a part of a procedure of disassembling a gas-insulated switchgear when an operation device is placed vertically to a circuit breaker.

In FIG. 1, the operation device 3 is provided side by side with the circuit breaker 1 on the longitudinal end near the branch outlet 2b. This is because it facilitates disassembling of the gas-insulated switchgear. A disassembling operation is explained while comparing FIG. 2 with FIG. 8. FIG. 2 depicts a part of a procedure of disassembling the gas-insulated switchgear according to the first embodiment. More specifically, FIG. 2 depicts a part of the procedure of disassembling the gas-insulated switchgear when the operation device 3 is provided side by side with the circuit breaker 1. FIG. 8 depicts a part of a procedure of disassembling a gas-insulated switchgear when an operation device 153 is placed vertically to the circuit breaker 101.

FIG. 2 depicts the circuit breaker 1, the operation device 3, and the abutment 30 that are a part of the constituent elements shown in FIG. 1. Furthermore, an internal component 55 arranged within the circuit breaker tank is shown in the circuit breaker 1. The internal component 55 represents constituent components of the circuit breaker 1 including the circuit break unit and the like. When the operation device 3 is provided side by side with the circuit breaker 1 as in an example shown in FIG. 2, the internal component 55 and the operation device 3 can be disassembled by integrally pulling out the internal component 55 and the operation device 3 from the circuit breaker tank after detaching the internal component 55 from the side of the disconnect switches 5a and 5b in disassembling regions 33. At that time, a direction of pulling out the internal component 55 and the operation device 3 is the longitudinal direction of the circuit breaker 1 (see an arrow shown in FIG. 2).

On the other hand, FIG. 8 depicts the horizontal circuit breaker 101, the abutment 130 supporting the circuit breaker 101, and the operation device 153 provided in a lower portion of the circuit breaker 101. An internal component 155 arranged within the circuit breaker tank is shown in the circuit breaker 101. The internal component 155 represents constituent components of the circuit breaker 101 including a circuit break unit and the like. The operation device 153 is provided in the lower portion of the circuit breaker 101 in what is called a vertically-placed manner. In this case, the operation device 153 is detached from the internal component 155 in a disassembling region 133 first, and moved downward to disassemble the operation device 153. The internal component 155 is then detached from a side of disconnect switches (not shown) and pulled out from the circuit breaker tank in the longitudinal direction of the circuit breaker tank in disassembling regions 134. The internal component 155 can be thereby disassembled. That is, in a case of vertically placing the operation device 153, the internal component 155 and the operation device 3 are disassembled at two separate stages. Therefore, the operation device placed side by side is easier to disassemble than that placed vertically. The same holds true for the assembly workability. In FIG. 1, the operation device 3 can be placed vertically as shown in FIG. 8.

Second Embodiment

Figure 3:
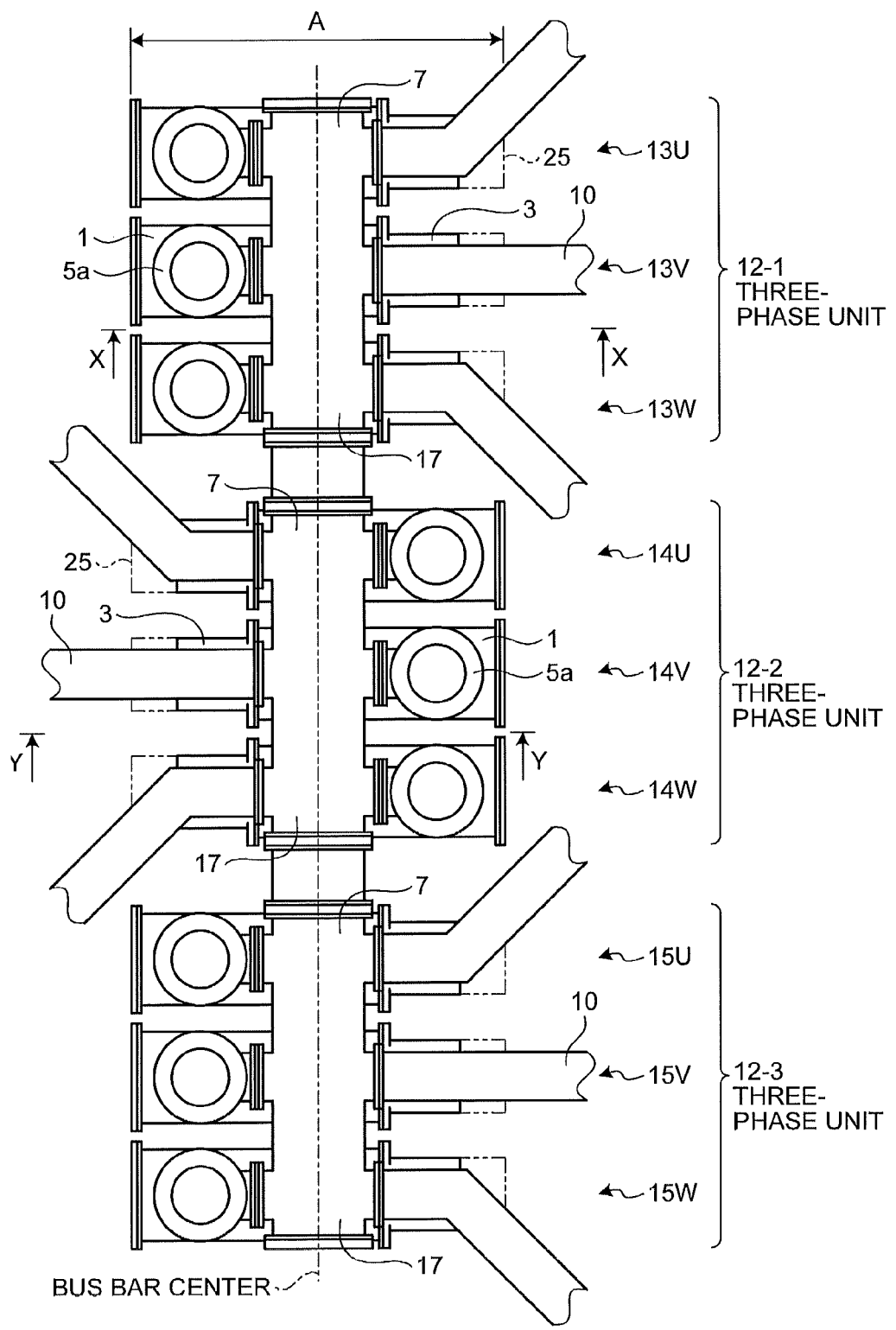
FIG. 3 is a top view of an arrangement configuration of a gas-insulated switchgear according to a second embodiment of the present invention.
Figure 4:
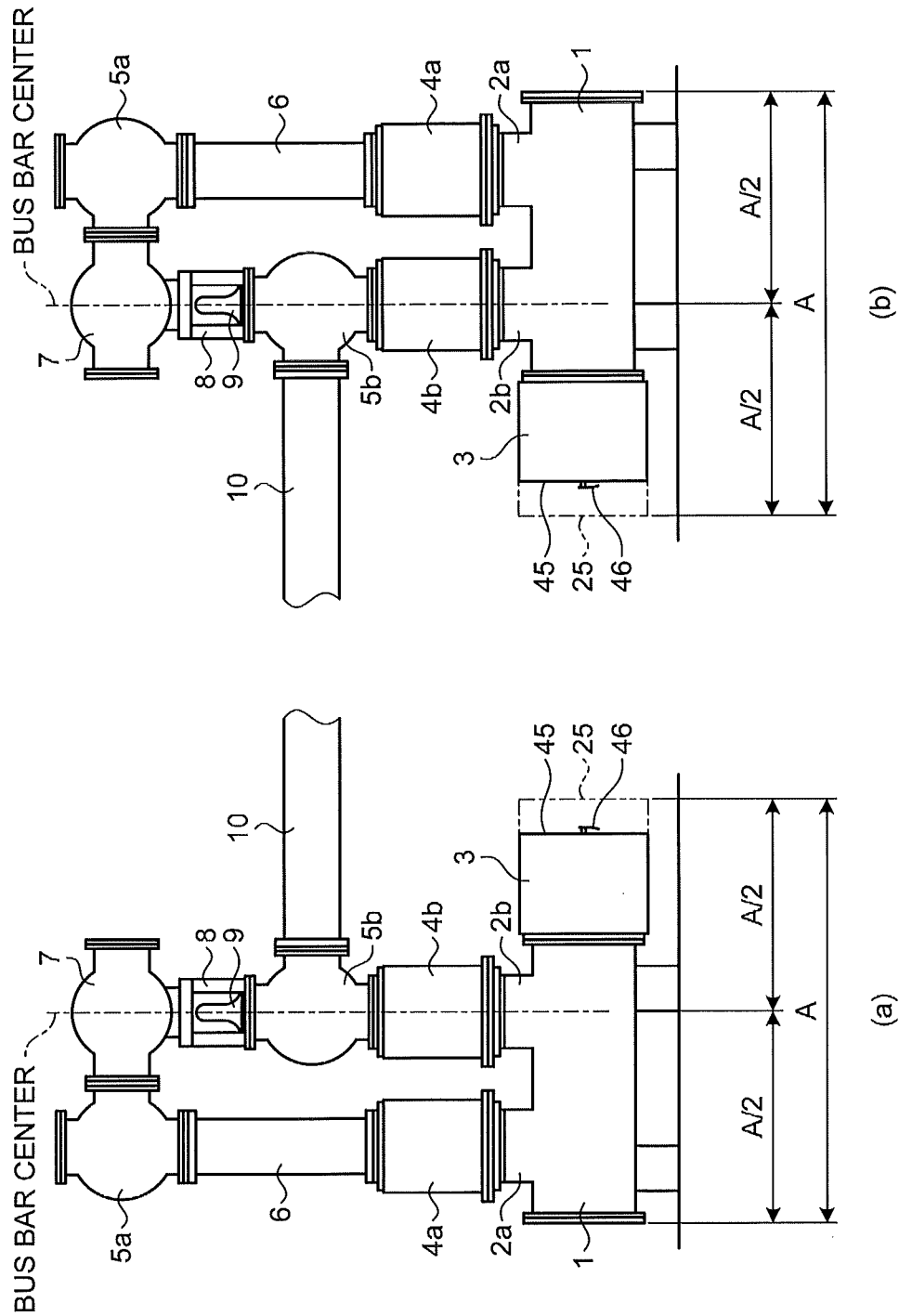
FIG. 4(*a*) is a side view taken in the direction of arrows X-X in FIG. 3 and FIG. 4(*b*) is a side view taken in the direction of arrows Y-Y in FIG. 3.

FIG. 3 is a top view of an arrangement configuration of a gas-insulated switchgear according to a second embodiment of the present invention. FIG. 4(a) is a side view taken in the direction of arrows X-X in FIG. 3 and FIG. 4(b) is a side view taken in the direction of arrows Y-Y in FIG. 3.

As shown in FIG. 3, the gas-insulated switchgear according to the second embodiment is configured to include three-phase units 12-1 to 12-3 provided in parallel in the extending direction of the main bus bars 7. The three-phase unit 12-1 is configured to provide a U-phase circuit breaker unit 13U, a V-phase circuit breaker unit 13V, and a W-phase circuit breaker unit 13W in parallel in the extending direction of the main bus bars 7. For example, the V-phase circuit breaker unit 13V includes the circuit breaker 1, the operation device 3, the instrument current transformers 4a and 4b, the disconnect switches 5a and 5b, the connection bus bar 6, the main bus bar 7, the abutment 8, the fast earth switch 9, and the line bus bar 10 (FIG. 4(a)). The configuration of the V-phase circuit breaker unit 13V is the same as that shown in FIG. 1 explained in the first embodiment. However, in the circuit breaker unit 13V, a distance from either a central axis of the branch outlet 2b or a bus bar center of the main bus bar 7 to the farthest end (the door-open-state end 25) of the operation device 3 in the longitudinal direction of the circuit breaker tank is equal to a distance from either the central axis of the branch outlet 2b or the bus bar center of the main bus bar 7 to a longitudinal end of the circuit breaker tank near the branch outlet 2a, and the distances are A/2, respectively (FIG. 4(a)). The configuration of the V-phase circuit breaker unit 13V can be applicable to the configurations of the U-phase circuit breaker unit 13U and the W-phase circuit breaker unit 13W.

The circuit breakers 1 in the respective phases of the three-phase unit 12-1 are arranged in parallel to one another and arrayed in the extending direction of the main bus bars 7. Furthermore, a bus bar tank 17 is shared among the main bus bars 7 of the respective phases of the three-phase unit 12-1, and central conductors (not shown) in the respective phases are stored within this bus bar tank 17 as a collective three-phases. Moreover, the line bus bars 10 in the respective phases of the three-phase unit 12-1 are led out in the same direction.

The three-phase unit 12-2 is configured to provide a U-phase circuit breaker unit 14U, a V-phase circuit breaker unit 14V, and a W-phase circuit breaker unit 14W in parallel in the extending direction of the main bus bars 7. For example, the V-phase circuit breaker unit 14V includes the circuit breaker 1, the operation device 3, the instrument current transformers 4*a* and 4*b*, the disconnect switches 5*a* and 5*b*, the connection bus bar 6, the main bus bar 7, the abutment 8, the fast earth switch 9, and the line bus bar 10 (FIG. 4(*b*)). The configuration of the V-phase circuit breaker unit 14V is the same as that shown in FIG. 1 explained in the first embodiment. However, in the circuit breaker unit 14V, a distance from either the central axis of the branch outlet 2*b* or the bus bar center of the main bus bar 7 to the farthest end (the door-open-state end 25) of the operation device 3 in the longitudinal direction of the circuit breaker tank is equal to a distance from either the central axis of the branch outlet 2*b* or the bus bar center of the main bus bar 7 to the longitudinal end of the circuit breaker tank near the branch outlet 2*a*, and the distances are A/2, respectively (FIG. 4(*b*)). Furthermore, a lead-out direction of the line bus bar 10 of the circuit breaker unit 14V is opposite to that of the line bus bars 10 of the circuit breaker units 13U, 13V, and 13W. The configuration of the V-phase circuit breaker unit 14V can be applicable to the configurations of the U-phase circuit breaker unit 14U and the W-phase circuit breaker unit 14W.

The circuit breakers 1 in the respective phases of the three-phase unit 12-2 are arranged in parallel to one another and arrayed in the extending direction of the main bus bars 7. Furthermore, the bus bar tank 17 is shared among the main bus bars 7 in the respective phases of the three-phase unit 12-2, and central conductors (not shown) in the respective phases are stored within this bus bar tank 17 as a collective three-phases. The bus bar tank 17 of the three-phase unit 12-2 is connected to that of the three-phase unit 12-1 while matching the bus bar centers to each other, and the central conductors (not shown) in each phase are connected to one another within the bus bar tanks 17. That is, the main bus bars 7 are connected to one another for every phase among the three-phase units.

The three-phase unit 12-3 is configured to provide a U-phase circuit breaker unit 15U, a V-phase circuit breaker unit 15V, and a W-phase circuit breaker unit 15W in parallel in the extending direction of the main bus bars 7. For example, the V-phase circuit breaker unit 15V includes the circuit breaker 1, the operation device 3, the instrument current transformers 4*a* and 4*b*, the disconnect switches 5*a* and 5*b*, the connection bus bar 6, the main bus bar 7, the abutment 8, the fast earth switch 9, and the line bus bar 10. The configuration of the V-phase circuit breaker unit 15V is the same as that shown in FIG. 1 explained in the first embodiment. However, in the circuit breaker unit 15V, a distance from either the central axis of the branch outlet 2*b* or the bus bar center of the main bus bar 7 to the farthest end (the door-open-state end 25) of the operation device 3 in the longitudinal direction of the circuit breaker tank is equal to a distance from either the central axis of the branch outlet 2*b* or the bus bar center of the main bus bar 7 to the longitudinal end of the circuit breaker tank near the branch outlet 2*a*, and the distances are A/2, respectively. Furthermore, a lead-out direction of the line bus bar 10 of the circuit breaker unit 15V is the same as that of the line bus bars 10 of the circuit breaker units 13U, 13V, and 13W, and opposite to that of the line bus bars 10 of the circuit breaker units 14U, 14V, and 14W. The configuration of the V-phase circuit breaker unit 15V can be applicable to the configurations of the U-phase circuit breaker unit 15U and the W-phase circuit breaker unit 15W.

The circuit breakers 1 in the respective phases of the three-phase unit 12-3 are arranged in parallel to one another and arrayed in the extending direction of the main bus bars 7. Furthermore, the bus bar tank 17 is shared among the main bus bars 7 in the respective phases of the three-phase unit 12-3, and central conductors (not shown) in the respective phases are stored within this bus bar tank 17 in as a collective three-phases. The bus bar tank 17 of the three-phase unit 12-3 is connected to that of the three-phase unit 12-2 while matching the bus bar centers to each other, and the central conductors (not shown) in each phase are connected to one another within the bus bar tanks 17. That is, the main bus bars 7 are connected to one another for every phase among the three-phase units.

As described above, the lead-out direction of the line bus bars 10 in the three phases of the three-phase unit 12-1 is opposite to that of the line bus bars 10 in the three phases of the three-phase unit 12-2. The lead-out direction of the line bus bars 10 in the three phases of the three-phase unit 12-2 is opposite to that of the line bus bars 10 in the three phases of the three-phase unit 12-3.

According to the second embodiment, the three-phase units 12-1 to 12-3 of the gas-insulated switchgear are configured to be arranged in such a manner that the lead-out directions of the line bus bars 10 of the three-phase units are reversed with respect to an array direction of the three-phase units (or specifically, the extending direction of the main bus bars 7) in alternate three-phase units. Therefore, it is unnecessary to secure a distance among the three-phase units and to avoid collision of the line bus bars 10 for all the three-phase units 12-1 to 12-3 differently from a case of making the lead-out directions of the line bus bars 10 of the three-phase units 12-1 to 12-3 uniform. This can further reduce a length of each main bus bar 7 and contribute to a reduction in the installation area.

For comparison with the configuration according to the second embodiment, a configuration of the gas-insulated switchgear shown in FIG. 5 in a case of arranging the gas-insulated switchgear in a layout similar to that shown in FIG. 3 is explained next.

Figure 6:
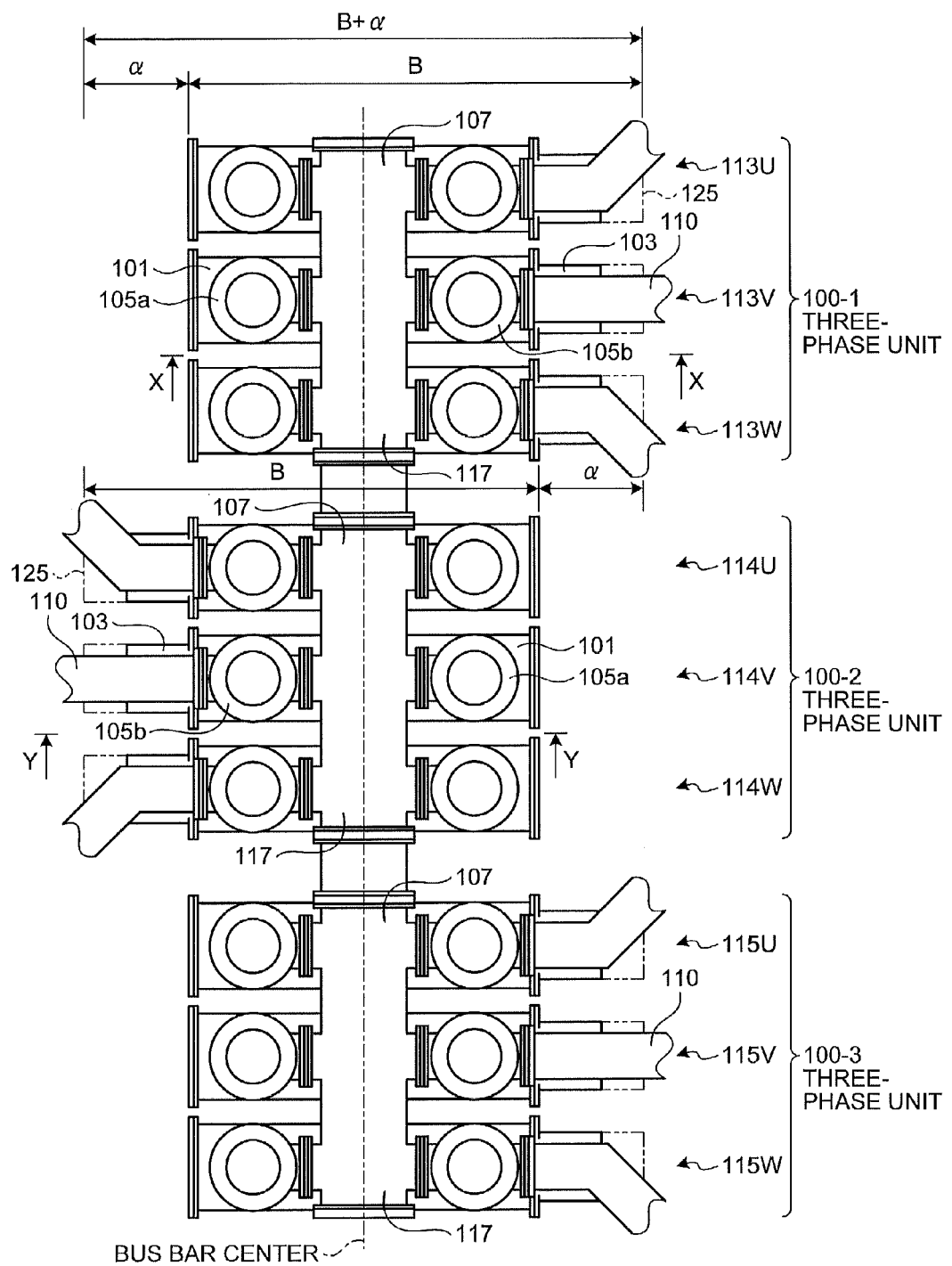
FIG. 6 is a top view of an arrangement configuration of the gas-insulated switchgear shown in FIG. 5 in a similar layout to that shown in FIG. 3.
Figure 7:
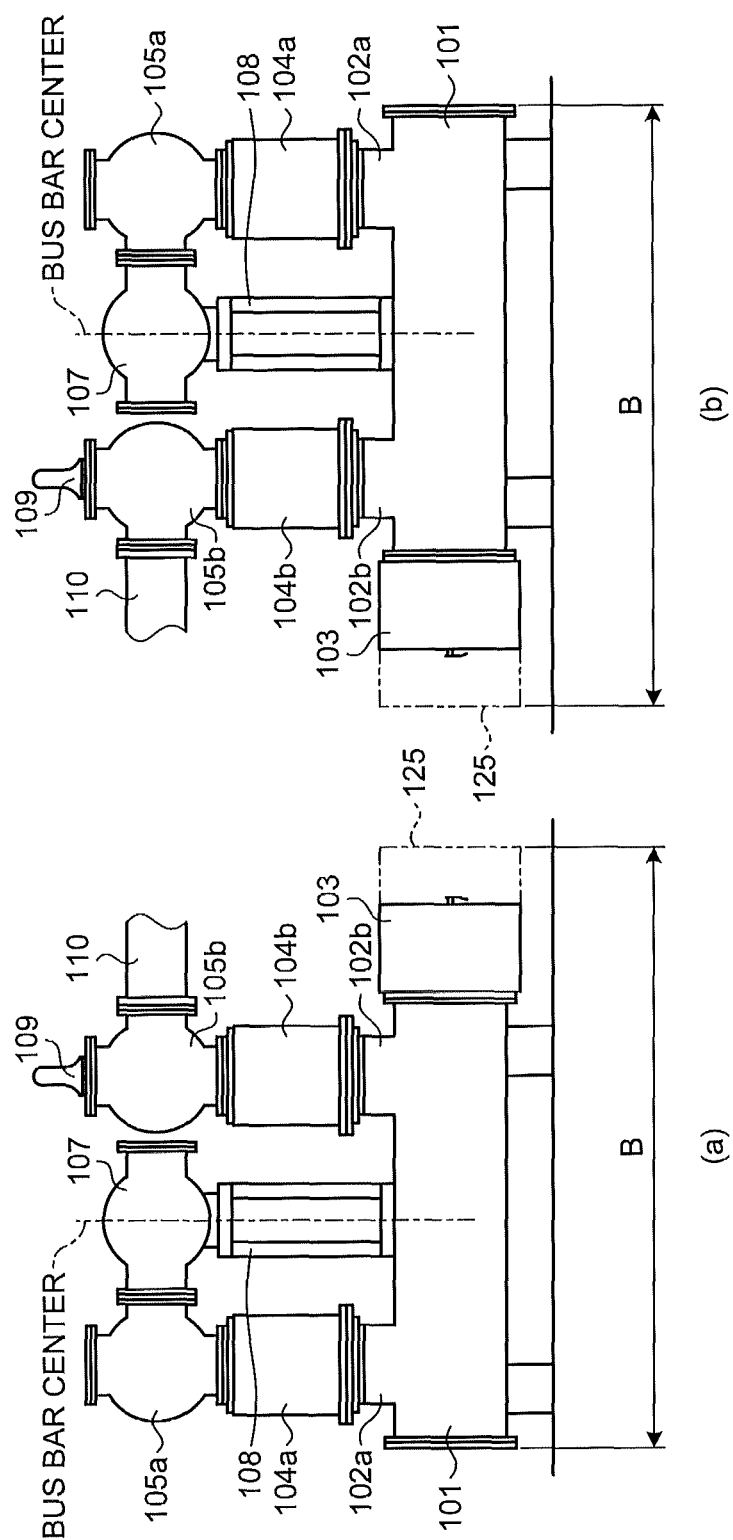
FIG. 7(*a*) is a side view taken in the direction of arrows X-X in FIG. 6 and FIG. 7(*b*) is a side view taken in the direction of arrows Y-Y in FIG. 6.

FIG. 6 is a top view of an arrangement configuration of the gas-insulated switchgear shown in FIG. 5 in the similar layout to that shown in FIG. 3. FIG. 7(*a*) is a side view taken in the direction of arrows X-X in FIG. 6 and FIG. 7(*b*) is a side view taken in the direction of arrows Y-Y in FIG. 6.

As shown in FIG. 6, the conventional gas-insulated switchgear is configured to include three-phase units 100-1 to 100-3 provided in parallel in the extending direction of the main bus bars 107. The three-phase unit 100-1 is configured to provide a U-phase circuit breaker unit 113U, a V-phase circuit breaker unit 113V, and a W-phase circuit breaker unit 113W in parallel in the extending direction of the main bus bars 107. For example, the V-phase circuit breaker unit 113V includes the circuit breaker 101, the operation device 103, the instrument current transformers 104*a* and 104*b*, the disconnect switches 105*a* and 105*b*, the main bus bar 107, the abutment 108, the fast earth switch 109, and the line bus bar 110 (FIG. 7(*a*)). The configuration of the V-phase circuit breaker unit 113V is the same as that shown in FIG. 5 explained in the first embodiment. The configuration of the V-phase circuit breaker unit 113V can be applicable to the configurations of the U-phase circuit breaker unit 113U and the W-phase circuit breaker unit 113W.

The circuit breakers 101 in the respective phases of the three-phase unit 100-1 are arranged in parallel to one another and arrayed in the extending direction of the main bus bars 107. Furthermore, a bus bar tank 117 is shared among the main bus bars 107 in the respective phases of the three-phase unit 100-1, and central conductors (not shown) in the respective phases are stored within this bus bar tank 117 as a collective three-phases. Moreover, the line bus bars 110 in the respective phases of the three-phase unit 100-1 are led out in the same direction.

The three-phase unit 100-2 is configured to provide a U-phase circuit breaker unit 114U, a V-phase circuit breaker unit 114V, and a W-phase circuit breaker unit 114W in parallel in the extending direction of the main bus bars 107. For example, the V-phase circuit breaker unit 114V includes: the circuit breaker 101; the operation device 103; the instrument current transformers 104a and 104b; the disconnect switches 105a and 105b; the main bus bar 107; the abutment 108; the fast earth switch 109; and the line bus bar 110 (FIG. 7(b)). The configuration of the V-phase circuit breaker unit 114V is the same as that shown in FIG. 5 explained in the first embodiment. Furthermore, a lead-out direction of the line bus bar 110 of the circuit breaker unit 114V is opposite to that of the line bus bars 110 of the circuit breaker units 113U, 113V, and 113W. The configuration of the V-phase circuit breaker unit 114V can be applicable to the configurations of the U-phase circuit breaker unit 114U and the W-phase circuit breaker unit 114W.

The circuit breakers 101 in the respective phases of the three-phase unit 100-2 are arranged in parallel to one another and arrayed in the extending direction of the main bus bars 107. Furthermore, the bus bar tank 117 is shared among the main bus bars 107 in the respective phases of the three-phase unit 100-2, and central conductors (not shown) in the respective phases are stored within this bus bar tank 117 as a collective three-phases. The bus bar tank 117 of the three-phase unit 100-2 is connected to that of the three-phase unit 100-1 while matching the bus bar centers to each other, and the central conductors (not shown) in each phase are connected to one another within the bus bar tanks 117.

The three-phase unit 100-3 is configured to provide a U-phase circuit breaker unit 115U, a V-phase circuit breaker unit 115V, and a W-phase circuit breaker unit 115W in parallel in the extending direction of the main bus bars 107. For example, the V-phase circuit breaker unit 115V includes: the circuit breaker 101; the operation device 103; the instrument current transformers 104a and 104b; the disconnect switches 105a and 105b; the main bus bar 107; the abutment 108; the fast earth switch 109; and the line bus bar 110. The configuration of the V-phase circuit breaker unit 115V is the same as that shown in FIG. 5 explained in the first embodiment. Furthermore, a lead-out direction of the line bus bar 110 of the circuit breaker unit 115V is the same as that of the line bus bars 110 of the circuit breaker units 113U, 113V, and 113W, and opposite to that of the line bus bars 110 of the circuit breaker units 114U, 114V, and 114W. The configuration of the V-phase circuit breaker unit 115V can be applicable to the configurations of the U-phase circuit breaker unit 115U and the W-phase circuit breaker unit 115W.

The circuit breakers 101 in the respective phases of the three-phase unit 100-3 are arranged in parallel to one another and arrayed in the extending direction of the main bus bars 107. Furthermore, the bus bar tank 117 is shared among the main bus bars 107 in the respective phases of the three-phase unit 100-3, and central conductors (not shown) in the respective phases are stored within this bus bar tank 117 as a collective three-phases. The bus bar tank 117 of the three-phase unit 100-3 is connected to that of the three-phase unit 100-2 while matching the bus bar centers to each other, and the central conductors (not shown) in each phase are connected to one another within the bus bar tanks 117.

In FIG. 6, the three-phase units 100-1 to 100-3 are arranged in such a manner that the lead-out directions of the line bus bars 110 of the three-phase units are reversed with respect to the array direction of the three-phase units (or specifically, the extending direction of the main bus bars 107) in alternate three-phase units. With this configuration, an extension range of each of the circuit breakers 101 and the corresponding operation device 103 in the longitudinal direction of the circuit breaker 101 is (B+α), where α is a maximum length of the operation device 103 in the longitudinal direction of the circuit breaker 101. In FIG. 3, in contrast, an extension range of each of the circuit breakers 1 and the corresponding operation device 3 in the longitudinal direction of the circuit breaker 1 is A. This is because, in FIG. 3, the distance from the central axis of the branch outlet 2b to the farthest end (the door-open-state end 25) of the operation device 3 in the longitudinal direction of the circuit breaker tank is set equal to the distance from the central axis of the branch outlet 2b to the longitudinal end of the circuit breaker tank near the branch outlet 2a. Because A<B as explained in the first embodiment, A<(B+α) and thus a difference in lengths in the longitudinal direction of the circuit breaker 1 is far greater. In this way, the extension range of the circuit breaker 1 and the operation device 3 in the longitudinal direction of the circuit breaker 1 is shorter than that in the arrangement configuration of FIG. 6, which contributes to the reduction in the installation area.

As described above, according to the second embodiment, the three-phase units 12-1 to 12-3 are configured to be arranged in such a manner that the lead-out directions of the line bus bars 10 of the three-phase units 12-1 to 12-3 are reversed with respect to the array direction of the three-phase units (or specifically, the extending direction of the main bus bars 7) in alternate three-phase units. Therefore, it is possible to further shorten the main bus bars 7, which contributes to the reduction in the installation area.

Furthermore, according to the second embodiment, the distance from either the central axis of each branch outlet 2b or the bus bar center of each main bus bar 7 to the farthest end (the door-open-state end 25) of each operation device 3 in the longitudinal direction of each circuit breaker tank is set equal to the distance from either the central axis of the branch outlet 2b or the bus bar center of the main bus bar 7 to the longitudinal end of the circuit breaker tank near each branch outlet 2a. Therefore, the extension range of the circuit breaker 1 and the operation device 3 in the longitudinal direction of the circuit breaker 1 is much shorter than that according to the conventional technique, which contributes to the reduction in the installation area.

In FIG. 3, the number of three-phase units is assumed as three, for example. However, the number of three-phase units is not limited to three but a plurality of three-phase units can be generally provided. These three-phase units can be arranged in such a manner that the lead-out directions of the line bus bars 10 of the three-phase units are reversed with respect to the array direction of the three-phase units in alternate three phase units.

When three or more three-phase units are arrayed, the three-phase units can be configured to set the lead-out direction of the line bus bars 10 of at least one three-phase unit to be opposite to the lead-out directions of the line bus bars 10 of the remaining one or more three-phase units. In this case, the main bus bars 7 are shorter than those in the case where the lead-out directions of the line bus bars 10 are the same for all the three-phase units, and thus this can advantageously contribute to the reduction in the installation area. In FIG. 3, for example, the three-phase units 12-1 to 12-3 can be configured to set the lead-out direction of the line bus bars 10 of the three-phase unit 12-3 to be opposite to that shown in FIG. 3 without changing the lead-out directions of the line bus bars 10 of the three-phase units 12-1 and 12-2.

In the second embodiment, the three-phase collective type has been explained. The same holds true for the phase separation type. In this case, the main bus bars 7 of the circuit breaker units 13U, 14U, and 15U are connected to one another, the main bus bars 7 of the circuit breaker units 13V, 14V, and 15V are connected to one another, and the main bus bars 7 of the circuit breaker units 13W, 14W, and 15W are connected to one another. In addition, the main bus bars 7 are arranged at different heights among the three phases.

INDUSTRIAL APPLICABILITY

As described above, the present invention is useful as a gas-insulated switchgear.

REFERENCE SIGNS LIST

1 circuit breaker
2a, 2b branch outlet
3 operation device
4a, 4b instrument current transformer
5a, 5b disconnect switch
6 connection bus bar
7 main bus bar
8 abutment
8a support
8b leg
9 fast earth switch
9b flange
10 line bus bar
12-1 to 12-3 three-phase unit
13U, 13V, 13W circuit breaker unit
14U, 14V, 14W circuit breaker unit
15U, 15V, 15W circuit breaker unit
17 bus bar tank
25 door-open-state end
30 abutment
33 disassembling region
40 installation surface
45 door
46 opening/closing lever
50 top plate
55 internal component
100-1 to 100-3 three-phase unit
101 circuit breaker
102a, 102b branch outlet
103 operation device
104a, 104b instrument current transformer
105a, 105b disconnect switch
107 main bus bar
108 abutment
109 fast earth switch
110 line bus bar
113U, 113V, 113W circuit breaker unit
114U, 114V, 114W circuit breaker unit
115U, 115V, 115W circuit breaker unit
117 bus bar tank
130 abutment
133, 134 disassembling region
140 installation surface
145 door
146 opening/closing lever
153 operation device
155 internal component

The invention claimed is:
1. A gas-insulated switchgear comprising:
a circuit breaker that includes first and second branch outlets provided on a side surface of a cylindrical circuit breaker tank, the branch outlets being arranged to be distant from each other in a longitudinal direction of the circuit breaker tank and both branching off to upward;
a connection bus bar that has one end connected to the first branch outlet and that extends upward;
a first disconnect switch that is connected to the other end of the connection bus bar and that is arranged coaxially with the first branch outlet;
a second disconnect switch that is connected to the second branch outlet, that is arranged coaxially with the second branch outlet, and that is arranged at a lower position than a position of the first disconnect switch;
a line bus bar that is led out from the second disconnect switch in a horizontal direction;
a main bus bar that is arranged above the second disconnect switch coaxially with the second branch outlet, that is connected to the first disconnect switch, and that extends in the horizontal direction orthogonal to the longitudinal direction of the circuit breaker tank; and
an abutment that is fixed to a top portion of the second disconnect switch and that supports the main bus bar from below.

2. The gas-insulated switchgear according to claim 1, wherein the main bus bar is arranged at a same height as a height of the first disconnect switch.

3. The gas-insulated switchgear according to claim 1, wherein
a first instrument current transformer is arranged between the first branch outlet and the connection bus bar, and
a second instrument current transformer is arranged between the second branch outlet and the second disconnect switch.

4. The gas-insulated switchgear according to claim 1, wherein
a fast earth switch is provided on the top portion of the second disconnect switch, and
the abutment together with the fast earth switch is fixedly fastened to the top portion of the second disconnect switch with a fastening member.

5. The gas-insulated switchgear according to claim 1, wherein
an operation device for the circuit breaker is provided side by side with an end of the circuit breaker near the second branch outlet in the longitudinal direction of the circuit breaker tank, and
the line bus bar is led out in the longitudinal direction and to a side on which the operation device is arranged.

6. The gas-insulated switchgear according to claim 1, wherein
a plurality of three-phase units are arrayed in an extending direction of the main bus bar, each of the three-phase units including circuit breaker units in three phases, provided in parallel in the extending direction of the main bus bar, each of the circuit breaker units including the circuit breaker, the connection bus bar, the first disconnect switch, the second disconnect switch, the line bus bar, the main bus bar, and the abutment,
the main bus bars of the three-phase units are connected to one another for every phase, and
the line bus bars in the three phases of the three-phase units are led out oppositely with respect to the extending direction of the main bus bars in alternate three phase units.

7. The gas-insulated switchgear according to claim 6, wherein a distance from a central axis of each of the second branch outlets to a farthest end of each of the operation devices in the longitudinal direction of each of the circuit breaker tanks is equal to a distance from the central axis to an end of the corresponding circuit breaker tank near each of the first branch outlets in the longitudinal direction.

8. The gas-insulated switchgear according to claim 7, being of a three-phase collective type.

* * * * *